(12) United States Patent
Hsiao et al.

(10) Patent No.: US 10,990,325 B2
(45) Date of Patent: Apr. 27, 2021

(54) WRITE CONTROL METHOD, ASSOCIATED DATA STORAGE DEVICE AND CONTROLLER THEREOF

(71) Applicant: Silicon Motion Inc., Hsinchu County (TW)

(72) Inventors: Yu-Han Hsiao, Changhua County (TW); Yang-Chih Shen, Taoyuan (TW); Huan-Jung Yeh, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 78 days.

(21) Appl. No.: 16/590,398

(22) Filed: Oct. 2, 2019

(65) Prior Publication Data

US 2020/0110555 A1 Apr. 9, 2020

Related U.S. Application Data

(60) Provisional application No. 62/740,439, filed on Oct. 3, 2018.

(30) Foreign Application Priority Data

Jul. 15, 2019 (TW) ................................ 108124909

(51) Int. Cl.
*G06F 3/06* (2006.01)
*G06F 12/0804* (2016.01)
*G06F 12/08* (2016.01)

(52) U.S. Cl.
CPC ............ *G06F 3/0659* (2013.01); *G06F 3/068* (2013.01); *G06F 3/0613* (2013.01);
(Continued)

(58) Field of Classification Search
CPC .... G06F 3/0659; G06F 3/0613; G06F 3/0656; G06F 3/068; G06F 12/0804; G06F 2212/1016
(Continued)

(56) References Cited

U.S. PATENT DOCUMENTS 5,291,494 A 3/1994 Bruckert
5,625,840 A 4/1997 Numata
(Continued)

FOREIGN PATENT DOCUMENTS

JP 2006-107045 A 4/2006
JP 2009-230414 A 10/2009
(Continued)

*Primary Examiner* — Christopher B Shin
(74) *Attorney, Agent, or Firm* — Winston Hsu

(57) ABSTRACT

A write control method, an associated data storage device and the controller thereof are provided. The write control method includes: receiving one or more commands from a host device and executing the one or more commands, and performing determining operations to generate determining results; in response to the determining results, starting performing write collection; collecting and handling one or more write commands to buffer data of the one or more write commands through a buffer memory, and performing other determining operations to generate other determining results; in response to the other determining results, according to a quantity of one or more collected and handled write commands, determining whether data thereof has filled up a write buffer region of the buffer memory; and in response to the data having filled up the write buffer region, flushing the write buffer region to write the data therein into a nonvolatile memory.

20 Claims, 6 Drawing Sheets

(52) U.S. Cl.
CPC ........ *G06F 3/0656* (2013.01); *G06F 12/0804* (2013.01); *G06F 2212/1016* (2013.01)

(58) Field of Classification Search
USPC .......................................................... 711/103
See application file for complete search history.

(56) References Cited

U.S. PATENT DOCUMENTS

| | | | |
|---|---|---|---|
| 6,802,039 | B1 | 10/2004 | Quach |
| 6,804,794 | B1 | 10/2004 | Robidoux |
| 7,096,407 | B2 | 8/2006 | Olarig |
| 7,417,600 | B2 | 8/2008 | Smith |
| 8,959,420 | B1 | 2/2015 | Piszczek |
| 9,690,642 | B2 | 6/2017 | Anderson |
| 2006/0075186 | A1 | 4/2006 | Abe |
| 2008/0263302 | A1* | 10/2008 | Balluchi ............... G11C 7/1078 711/167 |
| 2010/0005366 | A1 | 1/2010 | Dell |
| 2010/0262771 | A1* | 10/2010 | Kurashige ........... G06F 12/0893 711/113 |
| 2012/0144094 | A1* | 6/2012 | Harasawa ................ G06F 3/06 711/103 |
| 2012/0159016 | A1* | 6/2012 | Morita ................ G06F 13/1673 710/33 |
| 2012/0278541 | A1* | 11/2012 | Yamaki ............... G06F 12/0246 711/103 |
| 2016/0110124 | A1 | 4/2016 | Camp |
| 2016/0110252 | A1 | 4/2016 | Hyun |
| 2016/0117253 | A1* | 4/2016 | Sprouse ............... G06F 12/0246 711/103 |
| 2016/0118132 | A1 | 4/2016 | Prins |
| 2016/0291883 | A1 | 10/2016 | Manohar |
| 2017/0031604 | A1* | 2/2017 | Lotem .................... G06F 3/0688 |
| 2017/0153826 | A1* | 6/2017 | Cho ......................... G06F 13/16 |
| 2017/0177276 | A1 | 6/2017 | Delaney |
| 2017/0262202 | A1 | 9/2017 | Seo |
| 2018/0004688 | A1* | 1/2018 | Chung ................ G06F 13/1673 |
| 2018/0025777 | A1 | 1/2018 | Jacobvitz |
| 2018/0059966 | A1* | 3/2018 | Lee ........................ G06F 3/0685 |
| 2018/0060232 | A1 | 3/2018 | Oshinsky |
| 2019/0187894 | A1* | 6/2019 | Benisty ................ G06F 13/4282 |
| 2019/0369921 | A1* | 12/2019 | Oh ...................... G11C 16/0483 |
| 2020/0020360 | A1* | 1/2020 | Kosuru ............... G11C 11/1675 |

FOREIGN PATENT DOCUMENTS

| | | |
|---|---|---|
| JP | 2014182847 A | 9/2014 |
| JP | 2015-176153 A | 10/2015 |
| KR | 19990087932 A | 12/1999 |
| KR | 20030075356 A | 9/2003 |
| KR | 1020040047584 A | 6/2004 |
| TW | I516915 B | 1/2016 |
| TW | I537815 B | 6/2016 |
| TW | I537967 B | 6/2016 |

* cited by examiner

… (US 10,990,325 B2)

WRITE CONTROL METHOD, ASSOCIATED DATA STORAGE DEVICE AND CONTROLLER THEREOF

CROSS REFERENCE TO RELATED APPLICATIONS

This application claims the benefit of U.S. Provisional Application No. 62/740,439, which was filed on Oct. 3, 2018, and is included herein by reference.

BACKGROUND OF THE INVENTION

1. Field of the Invention

The present invention is related to access of flash memories, and more particularly, to a write control method, an associated data storage device and a controller thereof.

2. Description of the Prior Art

Developments in flash memory technology have led to the wide application of portable or non-portable data storage devices. Examples include memory cards conforming to SD/MMC, CF, MS, XD or UFS specifications, solid-state drives, and embedded storage devices conforming to UFS or EMMC specifications. NAND flash memories may comprise single level cell (SLC) and multiple level cell (MLC) flash memories. New data storage device products may utilize triple level cell (TLC) flash memories, or even quadruple level cell (QLC) flash memories. To ensure that access control of a flash memory in a data storage device meets related specifications, a controller of the flash memory is usually configured to have some management mechanisms to properly manage internal operations thereof.

The data storage device with these management mechanisms has some disadvantages, however. For example, in a specific mode, data received by the data storage device from a host device may directly enter an internal memory positioned in a controller integrated circuit (IC), rather than entering an external memory outside the controller IC. As a storage capacity of the internal memory is much less than that of the external memory, a buffer space within the internal memory is quite limited. Although the specific mode may be configured to improve write performance of the data storage device, the limited buffer space of the internal memory may result in early triggering of writing the data into the flash memory. As a data amount of buffer data is insufficient, a portion of flash memory dies within the flash memory will be in an idle state. When the host device sends a read command, the inconsistency between respective idle time of different portions of flash memory dies within the flash memory may reduce overall transmission bandwidth of the flash memory, which degrades the overall performance of the data storage device.

Thus, there is a need for a novel method and associated architecture to implement a data storage device having a reliable management mechanism without introducing any side effect or in a way that is less likely to introduce side effects.

SUMMARY OF THE INVENTION

An objective of the present invention is to provide a write control method, an associated data storage device and a controller thereof, to solve the above problems.

Another objective of the present invention is to provide a write control method, an associated data storage device and a controller thereof, to make the data storage device have a reliable management mechanism without introducing any side effect or in a way that is less likely to introduce side effects.

At least one embodiment of the present invention provides a write control method, wherein the write control method is applicable to a data storage device. The data storage device comprises a non-volatile (NV) memory and a memory controller for controlling access of the NV memory. The NV memory comprises at least one NV memory element, and the aforementioned at least one NV memory element comprises a plurality of blocks. The write control method may comprise: receiving at least one command from a host device and executing the aforementioned at least one command; determining whether a length of a time interval between a current time and a start time reaches a predetermined time length threshold; determining whether a quantity of a plurality of commands received from the host device within the time interval reaches a predetermined command quantity threshold, wherein the plurality of commands comprises the aforementioned at least one command; determining whether respective quantities of read commands and write commands within the plurality of commands are respectively greater than a predetermined read command quantity threshold and a predetermined write command quantity threshold; in response to the length of the time interval reaching the predetermined time length threshold, the quantity of the plurality of commands reaching the predetermined command quantity threshold, and the respective quantities of the read commands and the write commands being respectively greater than the predetermined read command quantity threshold and the predetermined write command quantity threshold, starting to perform write collection; regarding the write collection, collecting a write command received from the host device and handling the write command to buffer data of the write command through a buffer memory, wherein the buffer memory is positioned in the memory controller; determining whether a length of another time interval between another current time and another start time is greater than another predetermined time length threshold; determining whether there is any additional host command; in response to the length of the other time interval not being greater than the other predetermined time length threshold, and a condition where there is an additional host command, determining whether data of one or more collected and handled write commands has filled up a write buffer region of the buffer memory according to a quantity of the one or more collected and handled write commands, wherein the one or more collected and handled write commands comprise the write command; and in response to the data of the one or more collected and handled write commands having filled up the write buffer region, flushing the write buffer region to write the data within the write buffer region into the NV memory.

At least one embodiment of the present invention provides a data storage device, which may comprise: an NV memory, configured to store information, wherein the NV memory comprises at least one NV memory element, and the aforementioned at least one NV memory element comprises a plurality of blocks; and a controller, coupled to the NV memory, configured to control operations of the data storage device. The controller may comprise: a buffer memory, configured to temporarily store information; and a processing circuit, wherein the processing circuit may control the controller according to a plurality of host commands from a host device, to allow the host device to access the NV memory through the controller. For example: the controller receives at least one command from the host device and executes the aforementioned at least one command; the controller determines whether a length of a time interval between a current time and a start time reaches a predetermined time length threshold; the controller determines whether a quantity of a plurality of commands received from the host device within the time interval reaches a predetermined command quantity threshold, wherein the plurality of commands comprise the aforementioned at least one command, and belong to the plurality of host commands; the controller determines whether respective quantities of read commands and write commands within the plurality of commands are respectively greater than a predetermined read command quantity threshold and a predetermined write command quantity threshold; in response to the length of the time interval reaching the predetermined time length threshold, the quantity of the plurality of commands reaching the predetermined command quantity threshold, and the respective quantities of the read commands and the write commands being respectively greater than the predetermined read command quantity threshold and the predetermined write command quantity threshold, the controller starts to perform write collection; regarding the write collection, the controller collects a write command received from the host device and handles the write command to buffer data of the write command through a buffer memory; the controller determines whether a length of another time interval between another current time and another start time is greater than another predetermined time length threshold; the controller determines whether there is any additional host command; in response to the length of the other time interval not being greater than the other predetermined time length threshold, and a condition where there is an additional host command, the controller determines whether data of one or more collected and handled write commands has filled up a write buffer region of the buffer memory according to a quantity of the one or more collected and handled write commands, wherein the one or more collected and handled write commands comprise the write command, and belong to the plurality of host commands; and in response to the data of the one or more collected and handled write commands having filled up the write buffer region, the controller flushes the write buffer region to write the data within the write buffer region into the NV memory.

At least one embodiment of the present invention provides a controller of a data storage device, wherein the data storage device comprises the controller and an NV memory. The NV memory comprises at least one NV memory element, and the aforementioned at least one NV memory element comprises a plurality of blocks. The controller may comprise: a buffer memory, configured to temporarily store information; and a processing circuit, configured to control the controller according to a plurality of host commands from a host device, to allow the host device to access the NV memory through the controller. For example: the controller receives at least one command from the host device and executes the aforementioned at least one command; the controller determines whether a length of a time interval between a current time and a start time reaches a predetermined time length threshold; the controller determines whether a quantity of a plurality of commands received from the host device within the time interval reaches a predetermined command quantity threshold, wherein the plurality of commands comprise the aforementioned at least one command, and belong to the plurality of host commands; the controller determines whether respective quantities of read commands and write commands within the plurality of commands are respectively greater than a predetermined read command quantity threshold and a predetermined write command quantity threshold; in response to the length of the time interval reaching the predetermined time length threshold, the quantity of the plurality of commands reaching the predetermined command quantity threshold, and the respective quantities of the read commands and the write commands being respectively greater than the predetermined read command quantity threshold and the predetermined write command quantity threshold, the controller starts performing write collection; regarding the write collection, the controller collects a write command received from the host device and handles the write command to buffer data of the write command through a buffer memory; the controller determines whether a length of another time interval between another current time and another start time is greater than another predetermined time length threshold; the controller determines whether there is any additional host command; in response to the length of the other time interval not being greater than the other predetermined time length threshold, and a condition where there is an additional host command, the controller determines whether data of one or more collected and handled write commands has filled up a write buffer region of the buffer memory according to a quantity of the one or more collected and handled write commands, wherein the one or more collected and handled write commands comprise the write command, and belong to the plurality of host commands; and in response to the data of the one or more collected and handled write commands having filled up the write buffer region, the controller flushes the write buffer region to write the data within the write buffer region into the NV memory.

By the carefully designed management mechanism, the present invention can properly control operations of a controller, and more particularly, can make a data storage device able to perform command rearrangement when receiving multiple commands comprising write commands and read commands. As the data storage device can perform command rearrangement when receiving the aforementioned multiple commands, the present invention can greatly reduce probability of flash memory dies within a flash memory being idle at different times, in order to increase overall transmission bandwidth of the flash memory and improve overall performance of the data storage device. In addition, implementation of embodiments of the present invention will not greatly increase additional costs. Thus, the problems of the related art can be solved without greatly increasing costs. In comparison with the related art, the present invention can achieve optimal performance of the data storage device without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
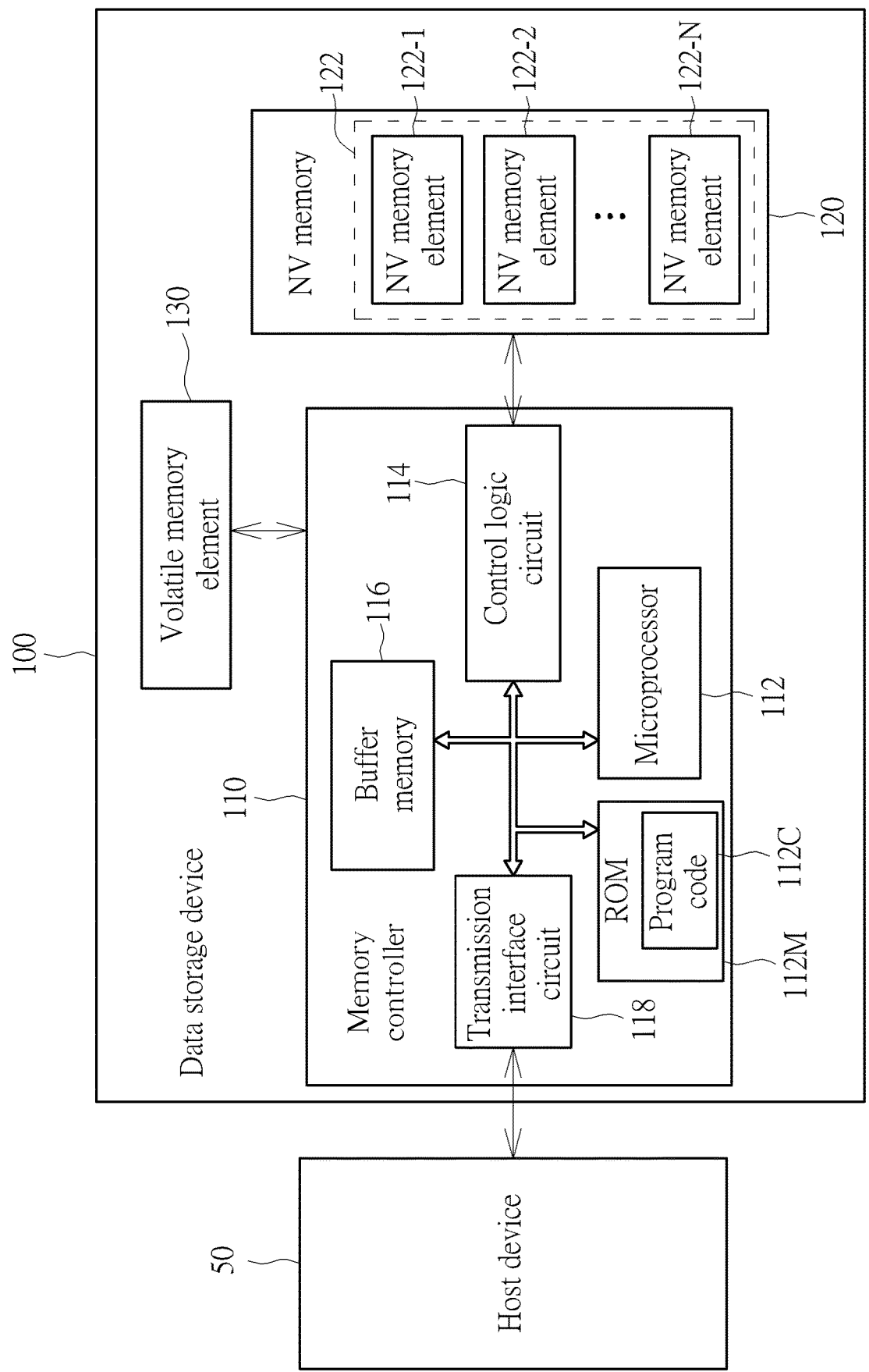
FIG. 1 is a diagram illustrating a data storage device and a host device according to an embodiment of the present invention.

FIG. 1 is a diagram illustrating a data storage device 100 and a host device 50 according to a first embodiment of the present invention. The data storage device 100 may be a solid-state drive (SSD). In addition, examples of the host device 50 may include, but are not limited to: a multifunctional mobile phone, a tablet and a personal computer such as a desktop computer and a laptop computer. According to this embodiment, the data storage device 100 may comprise a controller such as the memory controller 110, and may further comprise a non-volatile (NV) memory 120, where the controller is configured to access the NV memory 120, and the NV memory 120 is configured to store information.

The NV memory 120 may comprise a plurality of NV memory elements 122-1, 122-2, . . . and 122-N, where "N" may represent a positive integer greater than one. For example, the NV memory 120 maybe a flash memory, and the NV memory elements 122-1, 122-2, . . . and 122-N may be a plurality of flash memory chips or a plurality of flash memory dies, but the present invention is not limited thereto. In addition, the data storage device 100 may further comprise a volatile memory element 130 for buffering data, where the volatile memory element 130 is preferably a dynamic random access memory (DRAM). Under control of the memory controller 110, the data storage device 100 may utilize at least one portion (e.g. a portion or all) of the storage space of the volatile memory element 130 to be a data buffer region for temporarily storing data, e.g. during accessing the NV memory 120. In addition, the volatile memory element 130 is an optional element.

The memory controller 110 may comprise a processing circuit such as a microprocessor 112, a storage device such as a read only memory (ROM) 112M, a control logic circuit 114, a buffer memory 116 and a transmission interface circuit 118, where these elements may be coupled to each other via a bus. The buffer memory is preferably a static random access memory (SRAM). For example, the memory controller 110 may utilize the buffer memory 116 such as the SRAM to be a first layer of cache, and utilize the volatile memory element 130 such as the DRAM to be a second layer of cache. The storage capacity of the DRAM is preferably greater than that of the buffer memory 116, and data buffered by the buffer memory 116 may be from the DRAM or the NV memory 120.

The ROM 112M of this embodiment is configured to store a program code 112C, and the microprocessor 112 is configured to execute the program code 112C to control access to the NV memory 120. Note that the program code 112C may be stored in the buffer memory 116 or any type of memory. In addition, the control logic circuit 114 may comprise at least one error correction code (ECC) circuit (not shown) to protect data and/or perform error correction. The transmission interface circuit 118 may conform to a specific communications specification (such as the Serial Advanced Technology Attachment (SATA) specification, the Peripheral Component Interconnect Express (PCIE) specification or the Non-Volatile Memory Express (NVME) specification), and may perform communications according to the specific communications specification, and more particularly, may perform communication with the host device 50 according to the specific communications specification.

In this embodiment, the host device 50 may transmit a plurality of host commands to the data storage device 100, and the memory controller 110 accesses the NV memory 120 (e.g. reads or writes data in the NV memory 120) according to the host commands, where the aforementioned data is preferably user data from the host device 50. The host commands comprise logical addresses, e.g. logical block addresses (LBAs). The memory controller 110 may receive the host commands and respectively translate the host commands into memory operation commands (referred to as operation commands for brevity), and further control the NV memory 120 with the operation commands to read, write/program pages of specific physical addresses within the NV memory 120. The memory controller 110 records mapping relationships between logical addresses and physical addresses of data in a logical-to-physical address mapping table (referred to as L2P mapping table), where any of the physical addresses (e.g. each physical address) may be constituted by a channel number, a logical unit number (LUN), a plane number, a block number, a page number and an offset. In some embodiments, the implementation of the physical addresses may vary. For example, any of the physical addresses (e.g. each physical address) may comprise a channel number, an LUN, a plane number, a block number, a page number and/or an offset.

The L2P mapping table may be stored in a system block within the NV memory 120, and may be divided into a plurality of group mapping tables, where the system block is preferably an encrypted block and programmed in an SLC mode. The memory controller 110 may load partial or all group mapping tables within the plurality of group mapping tables into the buffer memory 116 from the NV memory 120 according to the capacity of the buffer memory 116 for quick reference, but the present invention is not limited thereto. When user data is updated, the memory controller 110 may update the group mapping tables according to a latest mapping relationship of the user data. A size of any group mapping table within the group mapping tables is preferably equal to a size of one page of a NV memory element 122-$n$, e.g. 16 KB(kilobytes), where "n" may represent any positive integer within an interval [1, N], but the present invention is not limited thereto. For example, the size of the aforementioned any group mapping table may be less than the size of one page, e.g. 4 KB or 1 KB. Of course, the size of the aforementioned any group mapping table may be equal to a size of one page of multiple NV memory elements such as 122-$n$.

The NV memory element 122-$n$ may comprise a plurality of planes such as planes #0 and #1, where each plane comprises a plurality of blocks, and each block comprises a plurality of pages. Under this situation, the memory controller 110 may combine respective one page(s) of the plane #0 and #1 into a big page, where a size of the big page is twice the size of one page, such as 32 KB.

In addition, the memory controller 110 may combine respective one big page(s) of respective one NV memory element(s) 122-$n$ within a plurality of channels, e.g. four channels CH0-CH3, into one super page, and these four NV memory elements 122-$n$ may be controlled by a same chip enable (CE) signal. Under this setting, a size SP_SIZE of a super page is equal to 128 KB (e.g. (32 KB)*4=128 KB), but the present invention is not limited thereto. For example, under a setting of the channel quantity being eight, such as that of channels CH0-CH7, the size SP_SIZE of the super page constituted by respective one big page(s) of respective one NV memory element(s) 122-$n$ within the channels CH0-CH7 is equal to 256 KB (e.g. (32 KB)*8=256 KB).

Additionally, the minimum unit that the memory controller 110 performs programming operations upon the NV memory 120 may be a page, and the minimum unit that the memory controller performs erasing operations upon the NV memory 120 may be a block.

In a write cache mode, the host device 50 may send a write command to request the memory controller 110 to write a set of user data (referred to as data for brevity) into the NV memory 120. The memory controller 110 may receive or download this set of data from the host device 50, utilize the buffer memory 116 to buffer this set of data, and utilize the volatile memory element 130 to temporarily store this set of data, and then directly respond with a message of completion of execution of the write command to the host device 50. Afterwards, when a write condition is satisfied, e.g. an accumulated data length is equal to or greater than a page length or a super page length, the memory controller 110 may write the cached data into the NV memory 120, but the present invention is not limited thereto.

In addition, under the write cache mode, the volatile memory element 130 is an optional element. For example, the data storage device 100 temporarily stores data received from the host device 50 into the buffer memory 116 such as the SRAM, and then directly responds with the message of completion of execution of the write command to the host device 50. As the storage capacity of the SRAM is much less than that of the DRAM, a size of a write buffer region of the SRAM is quite limited, e.g. 512 KB. Taking the four channels CH0-CH3 as an example, the size SP_SIZE of the super page is equal to 128 KB, thus, the buffer memory 116 may temporarily store four sets of data having a size of four super pages. Taking the eight channels CH0-CH7 as an example, the size SP_SIZE of the super page is equal to 256 KB, thus, the buffer memory 116 may merely temporarily store two sets of data having a size of two super pages.

Figure 2:
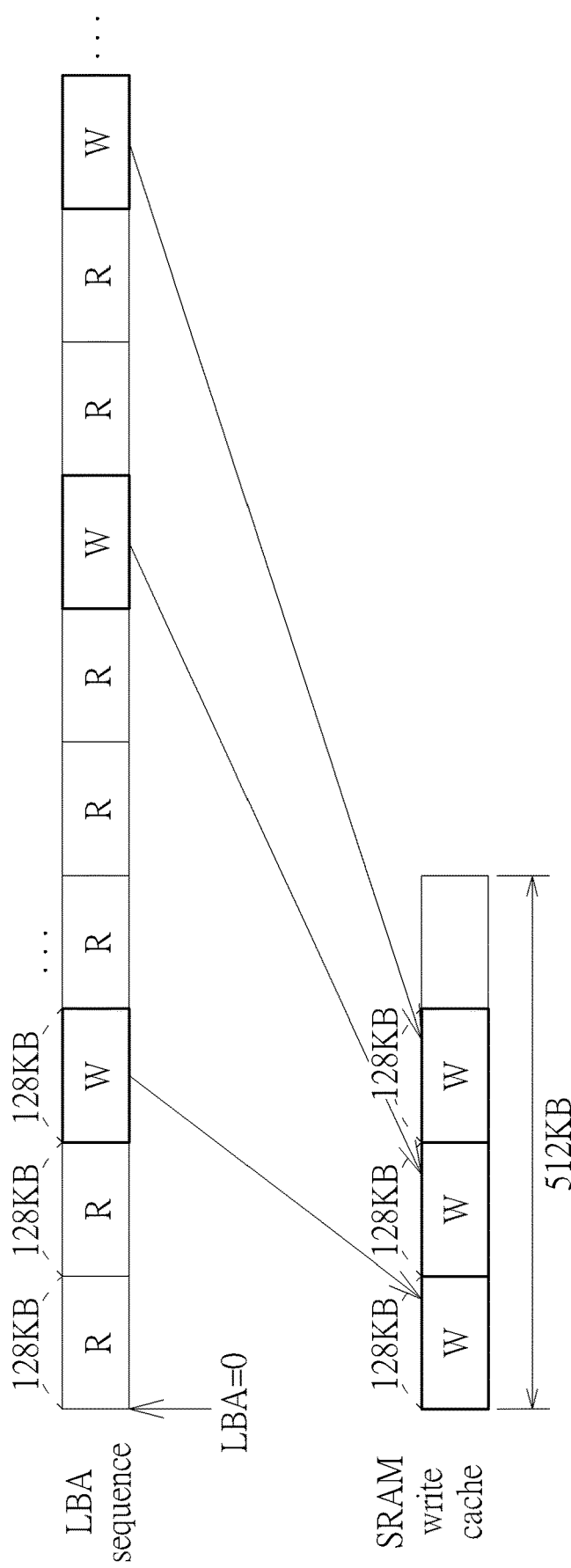
FIG. 2 illustrates a command rearrangement control scheme according to an embodiment of the present invention.

Under a real condition, a LBA sequence of the host device 50 may be quite complicated. For example, the host device 50 usually sends a mixture of commands comprising write commands and read commands to the memory controller 110 of the data storage device 100 as shown in FIG. 2. If the memory controller 110 is designed to be capable of performing command rearrangement upon the write commands (labeled "W") and the read commands (labeled "R"), and more particularly, temporarily storing data of the write commands into the buffer memory 116, waiting until a size of the data temporarily stored in the buffer memory 116 is equal to a predetermined data size such as the size of one or more super pages (e.g. the predetermined data size is equal to 512 KB), and then writing the data temporarily stored in the buffer memory 116 into the super page(s) within the NV memory 120, an execution efficiency of write commands can be significantly improved.

Figure 3:
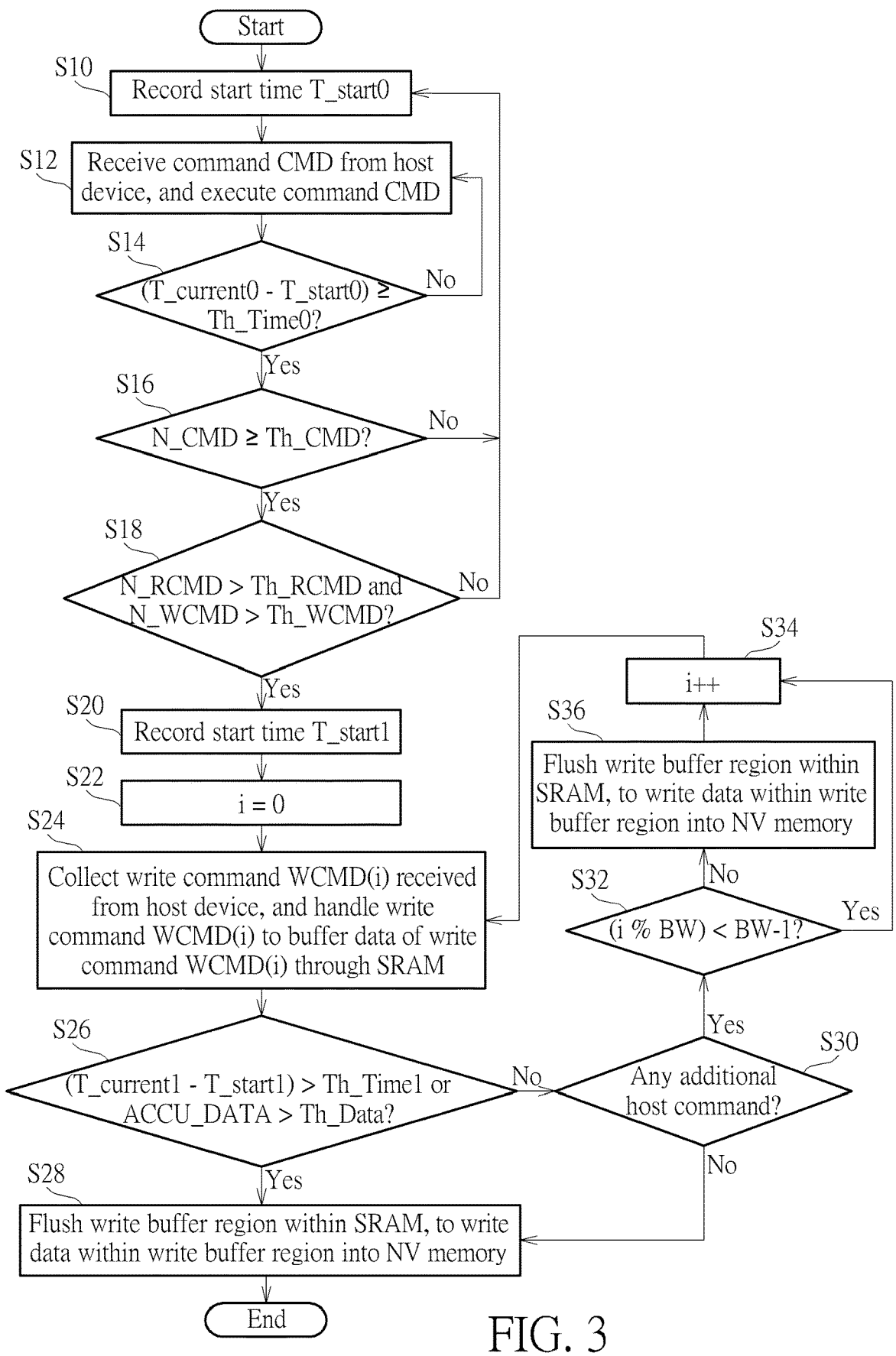
FIG. 3 illustrates a flowchart of a write control method according to an embodiment of the present invention.

FIG. 3 illustrates a flowchart of a write control method according to an embodiment of the present invention. This write control method is applicable to the data storage device 100, and executed by the memory controller 110 of the data storage device 100, for the memory controller 110 to perform write control of the data storage device 100 regarding the host device sending the mixture of commands comprising the write commands and the read commands. The write control method of the present invention may make the data storage device 100 capable of performing the aforementioned command rearrangement to greatly increase the execution efficiency of the write commands without affecting execution efficiency of the read commands, and thereby improve overall performance of the data storage device 100.

In the working flow shown in FIG. 3, the memory controller 110 may detect whether the host device has obvious mixed writing and reading behaviors through Steps S10-S18, and when the host device 50 is detected to have obvious mixed writing and reading behaviors, the memory controller 110 may perform the aforementioned command rearrangement through a series of steps starting from Step S20 without causing any timeout. Steps S10-S18 may be collectively referred to as an initial step of the write control method of the present invention, and Steps S20-S36 maybe collectively referred to as a write collection step of the write control method of the present invention and a portion of steps thereof such as S26~S30 may be regarded as a timeout management step, where each step is described as follows.

In Step S10, the memory controller 110 records a start time T_start0. The start time T_start0 may represent a reference time of a time window for observing behaviors of the host device 50. The memory controller 110 may perform time measurement to determine whether a time interval starting from the start time T_start0 reaches a predetermined size of this time window according to a length of the time interval starting from the start time T_start0.

In Step S12, the memory controller 110 receives at least one command (e.g. one or more commands) such as a command CMD from the host device 50, and executes the aforementioned at least one command such as the command CMD.

In Step S14, regarding a current time T_current0, the memory controller 110 determines whether a length (T_current0−T_start0) of a time interval [T_start0, T_current0] between the current time T_current0 and the start time T_start0 reaches (e.g. is greater than or equal to) a predetermined time length threshold Th_Time_0. If yes, Step S16 is entered; if no, Step S12 is entered. According to this embodiment, the predetermined time length threshold Th_Time0 is equal to 20 ms (milliseconds), but the present invention is not limited thereto.

In Step S16, the memory controller 110 determines whether a quantity N_CMD of a plurality of commands {CMD} received from the host device 50 within the time interval [T_start0, T_current0] reaches (e.g. is greater than or equal to) a predetermined command quantity threshold Th_CMD. If yes, Step S18 is entered; if no, Step S10 is entered. According to this embodiment, Th_CMD=256, but the present invention is not limited thereto. The plurality of commands {CMD} within this determination operation comprises the aforementioned at least one command such as the command CMD (e.g. respective commands CMD of multiple executions of Step S12). In addition, the length (T_current0−T_start0) of the time interval [T_start0, T_current0] in Step S16 may be equal to or slightly greater than the predetermined time length threshold Th_Time0, and more particularly, maybe regarded as being equal to the predetermined time length threshold Th_Time0 under a condition where a time error is omitted.

In Step S18, the memory controller 110 determines whether respective quantities N_RCMD and N_WCMD of read commands {RCMD} and write commands {WCMD} within the plurality of commands {CMD} are respectively greater than a predetermined read command quantity threshold Th_RCMD and a predetermined write command quantity threshold Th_WCMD. If yes, Step S20 is entered; if no, Step S10 is entered. According to this embodiment, Th_RCMD=16 and Th_WCMD=16, but the present invention is not limited thereto. A determination result of this determination operation may indicate whether the host device has obvious mixed writing and reading behaviors. In response to respective determination results of the consecutively executed Steps S14, S16 and S18 being "Yes" (which means the host device 50 has obvious mixed writing and reading behaviors), the memory controller 110 starts performing write collection, for example, performing some subsequent steps starting from Step S20. As the predetermined time length threshold Th_Time0 is typically small, these mixed writing and reading behaviors only start to appear when entering Step S20.

In Step S20, the memory controller 110 records a start time T_start1. The start time T_start1 may represent a reference time for detecting whether timeout is going to occur. The memory controller 110 may perform time measurement to determine whether timeout is going to occur according to a length of a time interval starting from the start time T_start1.

In Step S22, the memory controller 110 sets an index i to an initial value such as 0.

In Step S24, the memory controller 110 collects a write command WCMD(i) received from the host device 50, and handles the write command WCMD(i) to buffer data of the write command WCMD (i) through the buffer memory 116 such as the SRAM. For example, by executing a loop comprising Steps S24, S26, S30, S32, etc. multiple times, the memory controller 110 may start collecting and handling write commands {WCMD(0), WCMD(1), . . . } within subsequent commands of the plurality of commands {CMD}, but the present invention is not limited thereto.

In Step S26, regarding a current time T_current1, the memory controller 110 determines whether a length (T_current1−T_start1) of a time interval [T_start1, T_current1] between the current time T_current1 and the start_time T_start1 is greater than a predetermined time length threshold Th_Time1 or an accumulated data amount ACCU_DATA is greater than a predetermined accumulated data amount threshold Th_Data. If yes (e.g. (T_current1−T_start1)>Th_Time1 or ACCU_DATA>Th_Data), Step S28 is entered; if no (e.g. (T_current1−T_start1)<Th_Time1 and ACCU_DATA<Th_Data), Step S30 is entered. According to this embodiment, the predetermined time length threshold Th_Time1 is equal to 10 ms, the predetermined accumulated data amount threshold Th Data is equal to 51200 KB, and the accumulated data amount ACCU_DATA is equal to (SP_SIZE*(i+1)), but the present invention is not limited thereto. For example, the predetermined time length threshold Th_Time1 and/or the predetermined accumulated data amount threshold Th_Data may vary. In some embodiments, the accumulated data amount ACCU_DATA and the predetermined accumulated data amount threshold Th_Data may be replaced with the index i and a predetermined index threshold Th_Index, where the predetermined index threshold Th_Index is equal to 399, but the present invention is not limited thereto. For example, the predetermined index threshold Th_Index may vary.

In Step S28, the memory controller 110 flushes the write buffer region within the buffer memory 116 such as the SRAM, to write any data (e.g. data of any write command WCMD) within the write buffer region into the NV memory 120.

In Step S30, the memory controller 110 determines whether there is any additional host command, such as any additional command CMD from the host device 50 (e.g. any additional read command RCMD and any additional write command WCMD). If no (i.e. a condition where there is no additional host command), Step S28 is entered; if yes (i.e. a condition where there is an additional host command), Step S32 is entered.

In Step S32, the memory controller 110 determines whether a remainder (i % BW) of the index i divided by a predetermined command quantity BW is less than (BW−1), to determine whether data of one or more collected and handled write commands WCMD has filled up the write buffer region (e.g. a buffer space of 512 KB) according to a quantity of the one or more collected and handled write commands WCMD, where the predetermined command quantity BW is a positive integer greater than one, and "%" represents a modulo operator. If yes, Step S34 is entered; if no, Step S36 is entered.

The predetermined command quantity BW may be determined according to the size SP_SIZE of the super page. The memory controller 110 may utilize the size SP_SIZE (e.g. 128 KB) of the super page to be the base for collecting the write commands {WCMD(0), WCMD(1), . . . }, and more particularly, a data amount of each write command WCMD within the write commands {WCMD(0), WCMD(1), . . . } may be equal to the size SP_SIZE of the super page. The memory controller 110 may determine the predetermined command quantity BW to be a quotient of a size WBUF_SIZE of the write buffer region divided by the size SP_SIZE of the super page (e.g. WBUF_SIZE/SP_SIZE). For example, when WBUF_SIZE=512 (KB) and SP_SIZE=128 (KB), BW=(512/128)=4. Under this condition, the memory controller 110 may buffer data of four consecutive write commands in the write buffer region via executing Step S24 four times in order to fill up the write buffer region (e.g. a buffer space of 512 KB).

In Step S34, the memory controller 110 increases the index i by an increment such as 1 (labeled "i++" in FIG. 3 for brevity). Afterwards, Step S24 is entered. The memory controller 110 may collect and handle a next write command such as a latest write command WCMD (i) via executing Step S24 again.

In Step S36, the memory controller 110 flushes the write buffer region within the buffer memory 116 such as the SRAM, to write the data within the write buffer region (e.g. the data of the latest collected set of BW write commands, such as the data of a current set of write commands {WCMD (i−(BW−1)), . . . , WCMD(i−1), WCMD(i)} corresponding to a current value of the index i) into the NV memory 120.

Figure 4:
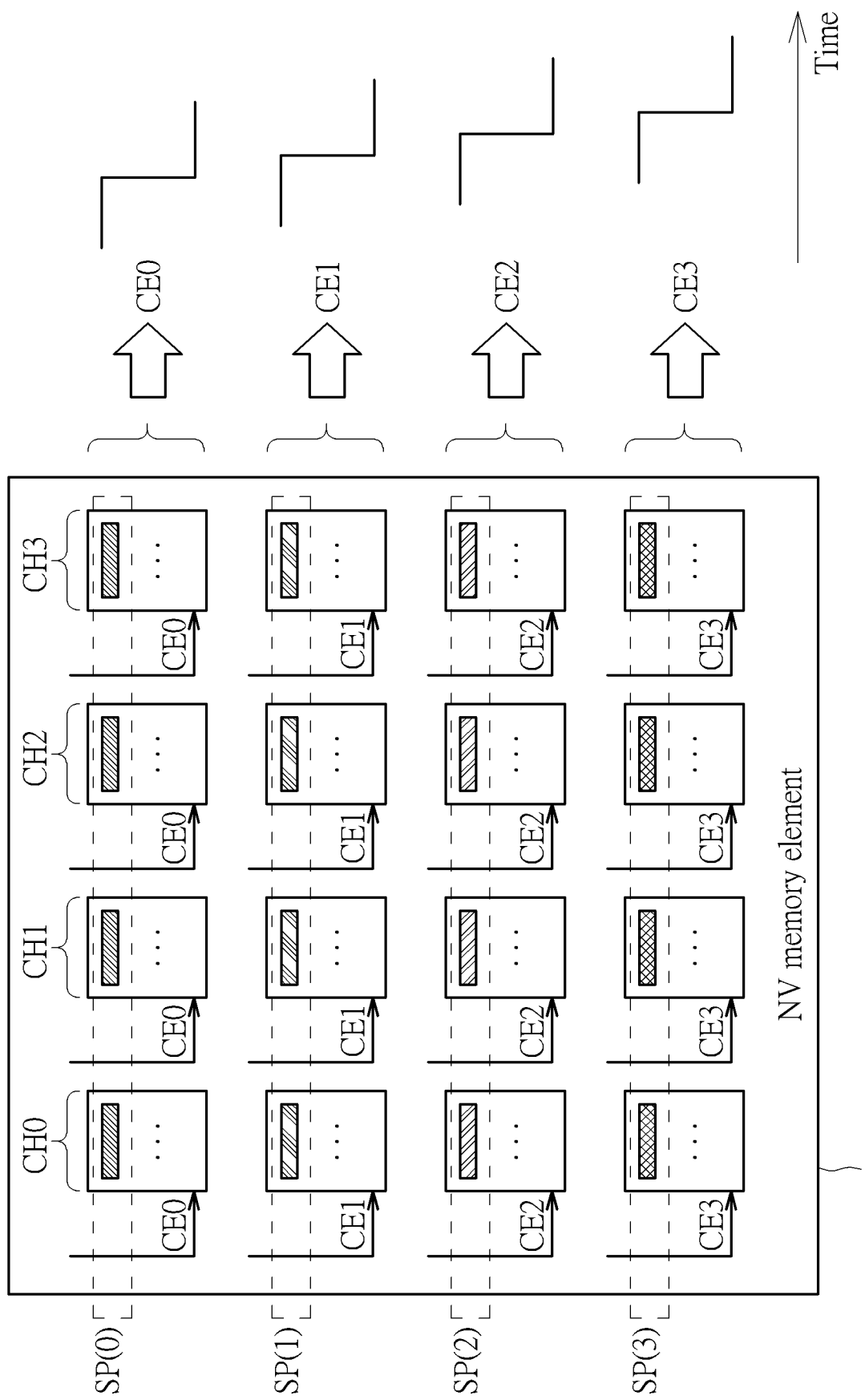
FIG. 4 illustrates a write control scheme of the write control method shown in FIG. 3 according to an embodiment of the present invention.

According to this embodiment, through executing the loop comprising Steps S24, S26, S30, S32, etc. multiple times, the memory controller 110 may handle this set of write commands {WCMD(i−(BW−1)), . . . , WCMD (i−1), WCMD (i)} within the collected write commands {WCMD (0), WCMD(1), . . . }, and more particularly, buffer the data of this set of write commands {WCMD (i−(BW−1)), . . . , WCMD (i−1), WCMD (i)} in the write buffer region, and flush the write buffer region to write the data of this set of write commands {WCMD (i−(BW−1)), . . . , WCMD(i−1), WCMD(i)} into the NV memory 120. For example, when WBUF=512 (KB) and SP_SIZE=128 (KB), BW=4. Under this condition, the memory controller 110 may buffer respective data DATA(0), DATA(1), DATA(2) and DATA(3) of the write commands { WCMD(0), WCMD(1), WCMD(2), WCMD(3)} in the write buffer region, and flush the write buffer region to respectively write the data DATA(0), DATA (1), DATA(2) and DATA(3) into the NV memory 120, to be four super pages SP(0), SP(1), SP(2) and SP(3) distributed in 16 NV memory elements 122 (e.g. N=16) as shown in FIG. 4.

These four super pages SP(0), SP(1), SP(2) and SP(3) respectively comprise respective four big pages (illustrated by shading in FIG. 4) of four rows of corresponding NV memory elements, and subsequent four super pages respectively comprise respective four subsequent big pages (illustrated by "..." in FIG. 4) of these four rows of corresponding NV memory elements, where the rest may be deduced by analogy. As the operation of flushing the write buffer region allows the memory controller 110 to continue buffering data of subsequently collected write commands, the memory controller 110 may consecutively write these four super pages SP(0), SP(1), SP(2) and SP(3) and subsequent multiple sets of four super pages, until at least one timeout avoidance condition is satisfied (e.g. a condition of entering Step S28 from Steps S26 or S30). Regarding obvious mixed writing and reading behaviors of the host device 50, the write control method of the present invention can greatly increase overall transmission bandwidth of the NV memory 120 (such as the flash memory) and thereby improve overall performance of the data storage device 100.

Figure 5:
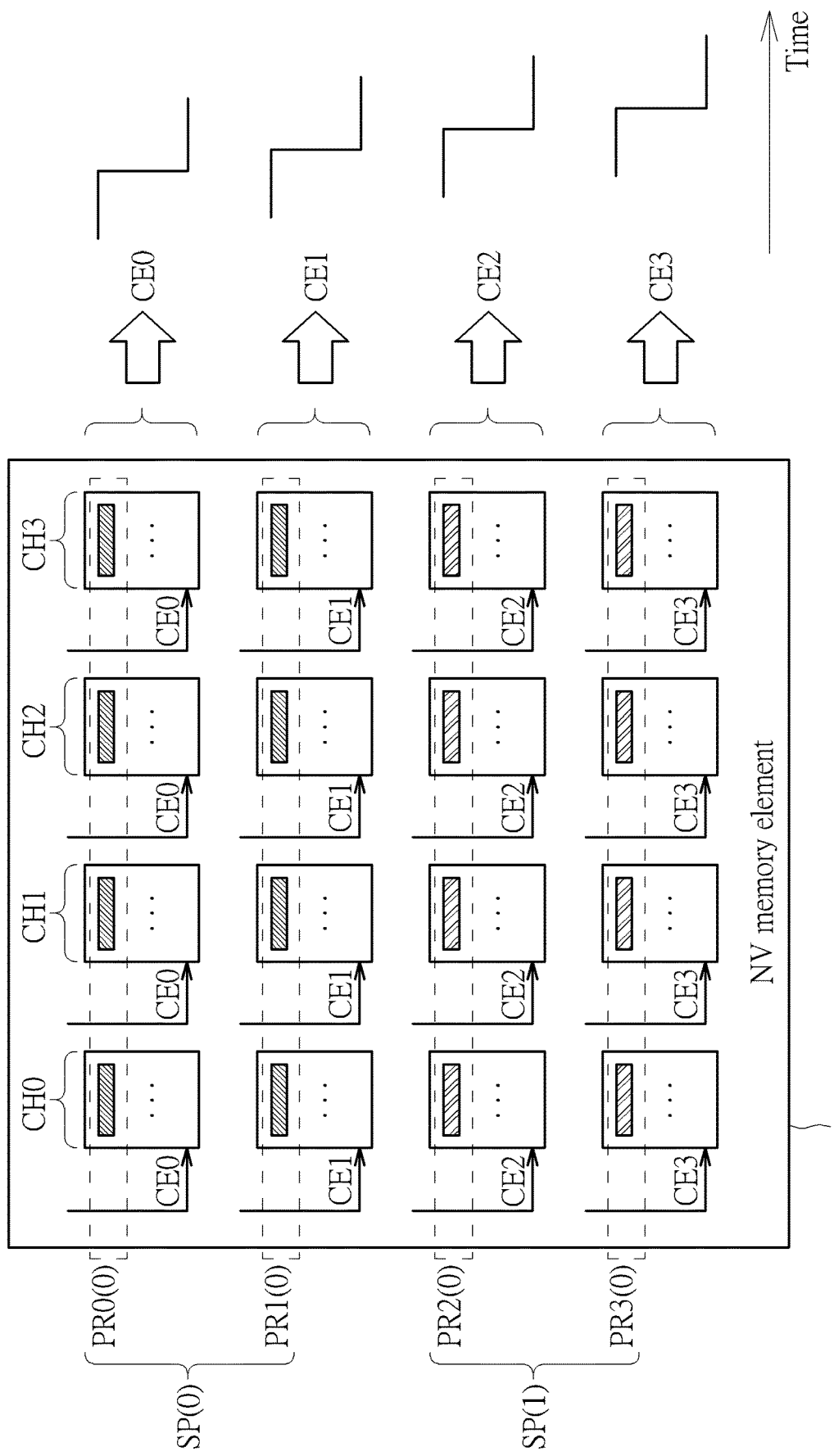
FIG. 5 illustrates a write control scheme of the write control method shown in FIG. 3 according to another embodiment of the present invention.

In addition, the size SP_SIZE of the super page may be expanded. For example, when WBUF_SIZE=512 (KB) and SP_SIZE=256 (KB), BW=(512/256)=2. Under this condition, the memory controller 110 may buffer respective data DATA(0) and DATA(1) of the write commands {WCMD(0), WCMD(1)} in the write buffer region, and flush the write buffer region to respectively write the data DATA(0) and DATA(1) into the NV memory 120, to be two super pages SP(0) and SP(1) distributed in 16 NV memory elements 122 (e.g. N=16) as shown in FIG. 5. For example, the super page SP(0) comprises respective big page groups PR0(0) and PR1(0) of a first row and a second row of NV memory elements, and the super page SP(1) comprises respective big page groups PR2(0) and PR3(0) of a third row and a fourth row of NV memory elements; the super page SP(2) comprises respective subsequent big page groups of the first row and the second row of NV memory elements, and the super page SP(3) comprises respective subsequent big page groups of the third row and the fourth row of NV memory elements; where the reset may be deduced by analogy.

Figure 6:
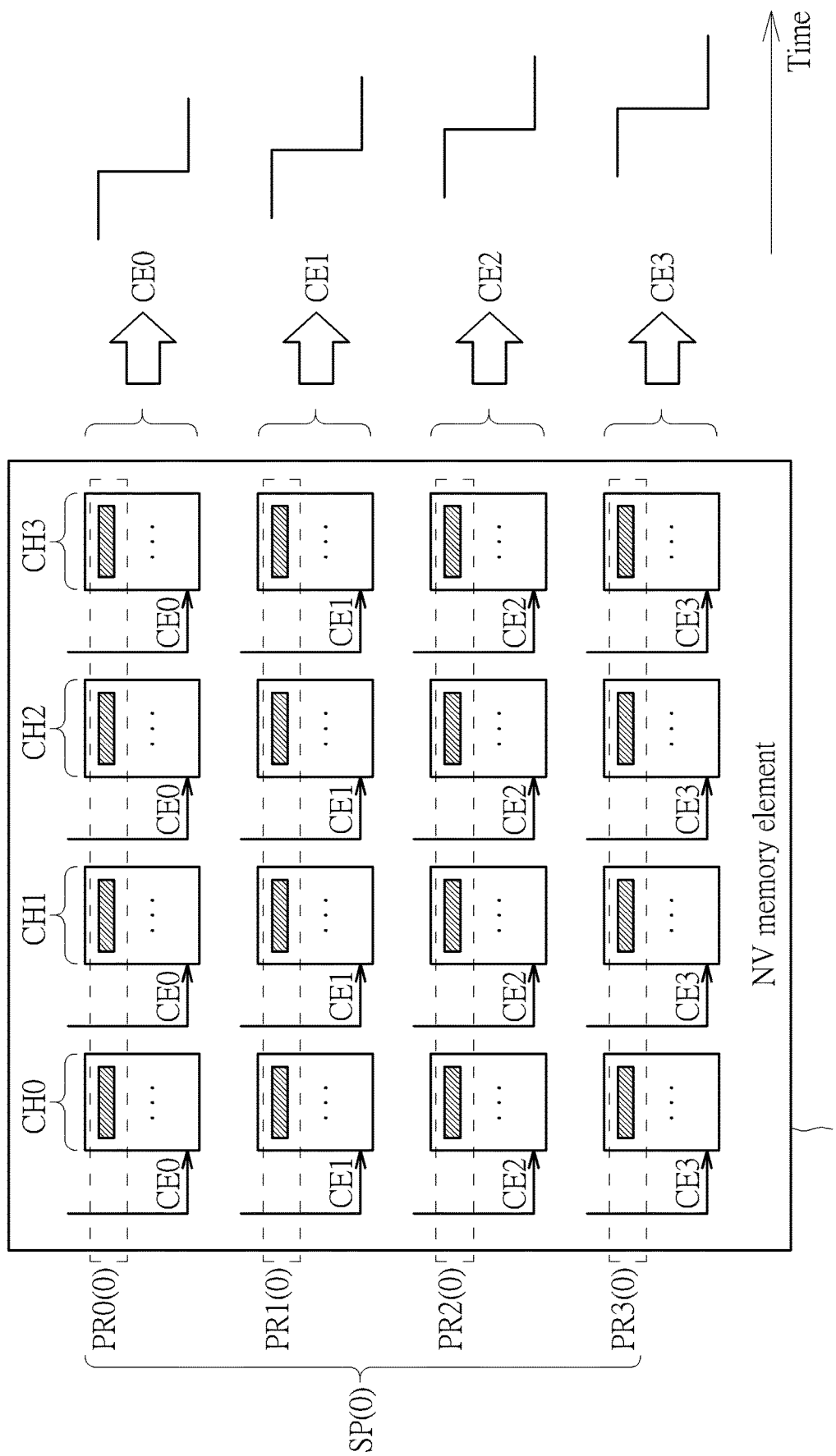
FIG. 6 illustrates a write control scheme of the write control method shown in FIG. 3 according to another embodiment of the present invention.

Additionally, the size SP_SIZE of the super page may be further expanded. For example, when WBUF_SIZE=512 (KB) and SP_SIZE=512 (KB), BW=(512/512)=1. Under this condition, the memory controller 110 may buffer the data DATA(0) of the write command WCMD(0) in the write buffer region, and flush the write buffer region to write the data DATA(0) into the NV memory 120, to be one super page SP(0) distributed in 16 NV memory elements 122 (e.g. N=16) as shown in FIG. 6. For example, the super page SP(0) comprises respective big page groups PR0(1), PR1(0), PR2(0) and PR3(0) of the first row to the fourth row of NV memory elements; the super page SP(1) comprises respective subsequent big page groups of the first row to the fourth row of NV memory elements; where the rest may be deduced by analogy.

In response to the change of architecture of the NV memory 120, the size WBUF_SIZE of the aforementioned write buffer region may be expanded. For example, the NV memory element 122-n may comprise four planes, such as planes #0, #1, #2 and #3. Under this condition, respective one page (s) of the planes #0, #1, #2 and #3 may be combined into one big page, and a size of the big page may be equal to four times the one page, such as 64 KB. In addition, in the NV memory 120, respective one big page(s) of some NV memory elements respectively corresponding to multiple channels (e.g. the channels CH0, CH1, CH2 and CH3) may be combined into one super page, and the size SP_SIZE of this super page may comprise the aforementioned four times factor. More particularly, the multiple channels may comprise the channels CH0, CH1, CH2 and CH3, and respective chip enable signals CE0, CE1, CE2 and CE3 of the channels CH0, CH1, CH2 and CH3 may be respectively configured to control corresponding NV memory elements.

When the super page comprises respective one big page(s) of 4 NV memory elements 122-n controlled by respective chip enable signal(s) CE0 of the channels CH0, CH1, CH2 and CH3, the size SP_SIZE of the super page is equal to 256 KB (e.g. (64 KB)*4=256 KB). For example, when WBUF_SIZE=1024 (KB) and SP_SIZE=256 (KB), BW=(1024/256)=4. Under this condition, the memory controller 110 may buffer respective data DATA(0), DATA(1), DATA(2) and DATA(3) of the write commands {WCMD(0), WCMD(1), WCMD(2), WCMD(3)} in the write buffer region, and flush the write buffer region to respectively write the data DATA(0), DATA(1), DATA(2) and DATA(3) into the NV memory 120, to be four super pages SP(0), SP(1), SP(2) and SP(3) distributed in 16 NV memory elements 122 (e.g. N=16) as shown in FIG. 4.

When the super page comprises respective one big page (s) of 8 NV memory elements 122-n controlled by respective chip enable signals CE0 and CE1 of the channels CH0, CH1, CH2 and CH3, the size SP_SIZE of the super page is equal to 512 KB (e.g. (64 KB)*8=512 KB). For example, when WBUF_SIZE=1024 (KB) and SP_SIZE=512 (KB), BW=(1024 / 512)=2. Under this condition, the memory controller 110 may buffer respective data DATA(0) and DATA(1) of the write commands {WCMD(0), WCMD(1)} in the write buffer region, and flush the write buffer region to respectively write the data DATA(0) and DATA(1) into the NV memory 120, to be two super pages SP(0) and SP(1) distributed in 16 NV memory elements 122 (e.g. N=16) as shown in FIG. 5.

When the super page comprises respective one big page(s) of 16 NV memory elements 122-n controlled by respective chip enable signals CE0, CE1, CE2 and CE3 of the channels CH0, CH1, CH2 and CH3, the size SP_SIZE of the super page is equal to 1024 KB (e.g. (64 KB)*16=1024 KB). For example, when WBUF_SIZE=1024 (KB) and SP_SIZE=1024 (KB), BW=(1024/1024)=1. Under this condition, the memory controller 110 may buffer the data DATA(0) of the write command WCMD(0) in the write buffer region, and flush the write buffer region to write the data DATA(0) into the NV memory 120, to be one super page SP(0) distributed in 16 NV memory elements 122 (e.g. N=16) as shown in FIG. 6.

Some steps within the working flow shown in FIG. 3 may comprise determination operations, and the memory controller 110 may execute operations of subsequent steps within this working flow according to respective determination results of these determination operations, such as executing subsequent operations corresponding to these determination results, in order to achieve optimal performance of the data storage device 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A write control method, the write control method being applicable to a data storage device, the data storage device comprising a non-volatile (NV) memory and a memory controller for controlling access of the NV memory, the NV memory comprising at least one NV memory element, said at least one NV memory element comprising a plurality of blocks, the write control method comprising:

receiving at least one command from a host device and executing said at least one command;

determining whether a length of a time interval between a current time and a start time reaches a predetermined time length threshold;

determining whether a quantity of a plurality of commands received from the host device within the time interval reaches a predetermined command quantity threshold, wherein the plurality of commands comprises said at least one command;

determining whether respective quantities of read commands and write commands within the plurality of commands are respectively greater than a predetermined read command quantity threshold and a predetermined write command quantity threshold;

in response to the length of the time interval reaching the predetermined time length threshold, the quantity of the plurality of commands reaching the predetermined command quantity threshold, and the respective quantities of the read commands and the write commands being respectively greater than the predetermined read command quantity threshold and the predetermined write command quantity threshold, starting performing write collection;

regarding the write collection, collecting a write command received from the host device and handling the write command to buffer data of the write command through a buffer memory, wherein the buffer memory is positioned in the memory controller;

determining whether a length of another time interval between another current time and another start time is greater than another predetermined time length threshold;

determining whether there is any additional host command;

in response to the length of the other time interval not being greater than the other predetermined time length threshold, and a condition where there is an additional host command, determining whether data of one or more collected and handled write commands has filled up a write buffer region of the buffer memory according to a quantity of the one or more collected and handled write commands, wherein the one or more collected and handled write commands comprise the write command; and in response to the data of the one or more collected and handled write commands having filled up the write buffer region, flushing the write buffer region to write the data within the write buffer region into the NV memory.

2. The write control method of claim 1, wherein the step of receiving said at least one command is executed multiple times, and the plurality of commands comprise respective commands of multiple executions of the step of receiving said at least one command.

3. The write control method of claim 1, wherein the step of determining whether the length of the other time interval between the other current time and the other start time is greater than the other predetermined time length threshold is executed multiple times to respectively generate a first determination result and a second determination result, wherein the first determination result and the second determination result respectively indicate the length of the other time interval not being greater than the other predetermined time length threshold and the length of the other time interval being greater than the other predetermined time length threshold; the step of determining whether the data of the one or more collected and handled write commands has filled up the write buffer region of the buffer memory according to the quantity of the one or more collected and handled write commands is performed in response to the first determination result; and the method further comprises:

in response to the second determination result, flushing the write buffer region to write any data within the write buffer region into the NV memory.

4. The write control method of claim 3, wherein the step of determining whether there is any additional host command is executed multiple times to respectively generate a third determination result and a fourth determination result, wherein each determination result of the third determination result and the fourth determination result indicates the condition where there is an additional host command.

5. The write control method of claim 4, wherein the step of determining whether the data of the one or more collected and handled write commands has filled up the write buffer region of the buffer memory according to the quantity of the one or more collected and handled write commands is executed multiple times to respectively generate a fifth determination result and a sixth determination result, wherein the fifth determination result and the sixth determination result respectively indicate the data of the one or more collected and handled write commands having filled up the write buffer region and the data of the one or more collected and handled write commands having not filled up the write buffer region; the step of flushing the write buffer region to write the data within the write buffer region into the NV memory is performed in response to the fifth determination result; and the method further comprises:

in response to the sixth determination result, collecting another write command received from the host device and handling the other write command to buffer data of the other write command through the buffer memory.

6. The write control method of claim 1, wherein the step of determining whether the length of the other time interval between the other current time and the other start time is greater than the other predetermined time length threshold is executed multiple times to respectively generate a first determination result and a second determination result, wherein each determination result of the first determination result and the second determination result indicates the length of the other time interval not being greater than the other predetermined time length threshold.

7. The write control method of claim 6, wherein the step of determining whether there is any additional host command is executed multiple times to respectively generate a third determination result and a fourth determination result, wherein the third determination result and the fourth determination result respectively indicate the condition where there is an additional host command and a condition where there is no additional host command; the step of determining whether the data of the one or more collected and handled write commands has filled up the write buffer region of the buffer memory according to the quantity of the one or more collected and handled write commands is performed in response to the third determination result; and the method further comprises:

in response to the fourth determination result, flushing the write buffer region to write any data within the write buffer region into the NV memory.

8. The write control method of claim 7, wherein the step of determining whether the data of the one or more collected and handled write commands has filled up the write buffer region of the buffer memory according to the quantity of the one or more collected and handled write commands is executed multiple times to respectively generate a fifth determination result and a sixth determination result, wherein the fifth determination result and the sixth determination result respectively indicate the data of the one or more collected and handled write commands having filled up the write buffer region and the data of the one or more collected and handled write commands having not filled up the write buffer region; the step of flushing the write buffer region to write the data within the write buffer region into the NV memory is performed in response to the fifth determination result; and the method further comprises:
  in response to the sixth determination result, collecting another write command received from the host device and handling the other write command to buffer data of the other write command through the buffer memory.

9. The write control method of claim 1, wherein the step of the step of determining whether the data of the one or more collected and handled write commands has filled up the write buffer region of the buffer memory according to the quantity of the one or more collected and handled write commands is executed multiple times to respectively generate a fifth determination result and a sixth determination result, wherein the fifth determination result and the sixth determination result respectively indicate the data of the one or more collected and handled write commands having filled up the write buffer region and the data of the one or more collected and handled write commands having not filled up the write buffer region; the step of flushing the write buffer region to write the data within the write buffer region into the NV memory is performed in response to the fifth determination result; and the method further comprises:
  in response to the sixth determination result, collecting another write command received from the host device and handling the other write command to buffer data of the other write command through the buffer memory.

10. The write control method of claim 1, wherein the one or more collected and handled write commands are collected from subsequent commands of the plurality of commands.

11. A data storage device, comprising:
  a non-volatile (NV) memory, configured to store information, wherein the NV memory comprises at least one NV memory element, and said at least one NV memory element comprises a plurality of blocks; and
  a controller, coupled to the NV memory, configured to control operations of the data storage device, wherein the controller comprises:
    a buffer memory, configured to temporarily store information; and
    a processing circuit, configured to control the controller according to a plurality of host commands from a host device, to allow the host device to access the NV memory through the controller, wherein:
      the controller receives at least one command from the host device and executes said at least one command;
      the controller determines whether a length of a time interval between a current time and a start time reaches a predetermined time length threshold;
      the controller determines whether a quantity of a plurality of commands received from the host device within the time interval reaches a predetermined command quantity threshold, wherein the plurality of commands comprise said at least one command, and belong to the plurality of host commands;
      the controller determines whether respective quantities of read commands and write commands within the plurality of commands are respectively greater than a predetermined read command quantity threshold and a predetermined write command quantity threshold;
      in response to the length of the time interval reaching the predetermined time length threshold, the quantity of the plurality of commands reaching the predetermined command quantity threshold, and the respective quantities of the read commands and the write commands being respectively greater than the predetermined read command quantity threshold and the predetermined write command quantity threshold, the controller starts performing write collection;
      regarding the write collection, the controller collects a write command received from the host device and handles the write command to buffer data of the write command through a buffer memory;
      the controller determines whether a length of another time interval between another current time and another start time is greater than another predetermined time length threshold;
      the controller determines whether there is any additional host command;
      in response to the length of the other time interval not being greater than the other predetermined time length threshold, and a condition where there is an additional host command, the controller determines whether data of one or more collected and handled write commands has filled up a write buffer region of the buffer memory according to a quantity of the one or more collected and handled write commands, wherein the one or more collected and handled write commands comprise the write command, and belong to the plurality of host commands; and
      in response to the data of the one or more collected and handled write commands having filled up the write buffer region, the controller flushes the write buffer region to write the data within the write buffer region into the NV memory.

12. The data storage device of claim 11, wherein the operation of receiving said at least one command is executed multiple times, and the plurality of commands comprise respective commands of multiple executions of the operation of receiving said at least one command.

13. The data storage device of claim 11, wherein the operation of determining whether the length of the other time interval between the other current time and the other start time is greater than the other predetermined time length threshold is executed multiple times to respectively generate a first determination result and a second determination result, wherein the first determination result and the second determination result respectively indicate the length of the other time interval not being greater than the other predetermined time length threshold and the length of the other time interval being greater than the other predetermined time length threshold; the operation of determining whether the data of the one or more collected and handled write commands has filled up the write buffer region of the buffer memory according to the quantity of the one or more collected and handled write commands is performed in response to the first determination result; and in response to the second determination result, the controller flushes the write buffer region to write any data within the write buffer region into the NV memory.

14. The data storage device of claim 13, wherein the operation of determining whether there is any additional host command is executed multiple times to respectively generate a third determination result and a fourth determination result, wherein each determination result of the third determination result and the fourth determination result indicates the condition where there is an additional host command.

15. The data storage device of claim 14, wherein the operation of determining whether the data of the one or more collected and handled write commands has filled up the write buffer region of the buffer memory according to the quantity of the one or more collected and handled write commands is executed multiple times to respectively generate a fifth determination result and a sixth determination result, wherein the fifth determination result and the sixth determination result respectively indicate the data of the one or more collected and handled write commands having filled up the write buffer region and the data of the one or more collected and handled write commands having not filled up the write buffer region; the operation of flushing the write buffer region to write the data within the write buffer region into the NV memory is performed in response to the fifth determination result; and in response to the sixth determination result, the controller collects another write command received from the host device and handles the other write command to buffer data of the other write command through the buffer memory.

16. The data storage device of claim 11, wherein the operation of determining whether the length of the other time interval between the other current time and the other start time is greater than the other predetermined time length threshold is executed multiple times to respectively generate a first determination result and a second determination result, wherein each determination result of the first determination result and the second determination result indicates the length of the other time interval not being greater than the other predetermined time length threshold.

17. The data storage device of claim 16, wherein the operation of determining whether there is any additional host command is executed multiple times to respectively generate a third determination result and a fourth determination result, wherein the third determination result and the fourth determination result respectively indicate the condition where there is an additional host command and a condition where there is no additional host command; the operation of determining whether the data of the one or more collected and handled write commands has filled up the write buffer region of the buffer memory according to the quantity of the one or more collected and handled write commands is performed in response to the third determination result; and in response to the fourth determination result, the controller flushes the write buffer region to write any data within the write buffer region into the NV memory.

18. The data storage device of claim 17, wherein the operation of determining whether the data of the one or more collected and handled write commands has filled up the write buffer region of the buffer memory according to the quantity of the one or more collected and handled write commands is executed multiple times to respectively generate a fifth determination result and a sixth determination result, wherein the fifth determination result and the sixth determination result respectively indicate the data of the one or more collected and handled write commands having filled up the write buffer region and the data of the one or more collected and handled write commands having not filled up the write buffer region; the operation of flushing the write buffer region to write the data within the write buffer region into the NV memory is performed in response to the fifth determination result; and in response to the sixth determination result, the controller collects another write command received from the host device and handles the other write command to buffer data of the other write command through the buffer memory.

19. A controller of a data storage device, the data storage device comprising the controller and a non-volatile (NV) memory, the NV memory comprising at least one NV memory element, said at least one NV memory element comprising a plurality of blocks, the controller comprising:
a buffer memory, configured to temporarily store information; and
a processing circuit, configured to control the controller according to a plurality of host commands from a host device, to allow the host device to access the NV memory through the controller, wherein:
the controller receives at least one command from the host device and executes said at least one command;
the controller determines whether a length of a time interval between a current time and a start time reaches a predetermined time length threshold;
the controller determines whether a quantity of a plurality of commands received from the host device within the time interval reaches a predetermined command quantity threshold, wherein the plurality of commands comprise said at least one command, and belong to the plurality of host commands;
the controller determines whether respective quantities of read commands and write commands within the plurality of commands are respectively greater than a predetermined read command quantity threshold and a predetermined write command quantity threshold;
in response to the length of the time interval reaching the predetermined time length threshold, the quantity of the plurality of commands reaching the predetermined command quantity threshold, and the respective quantities of the read commands and the write commands being respectively greater than the predetermined read command quantity threshold and the predetermined write command quantity threshold, the controller starts performing write collection;
regarding the write collection, the controller collects a write command received from the host device and handles the write command to buffer data of the write command through a buffer memory;
the controller determines whether a length of another time interval between another current time and another start time is greater than another predetermined time length threshold;
the controller determines whether there is any additional host command;
in response to the length of the other time interval not being greater than the other predetermined time length threshold, and a condition where there is an additional host command, the controller determines whether data of one or more collected and handled write commands has filled up a write buffer region of the buffer memory according to a quantity of the one or more collected and handled write commands, wherein the one or more collected and handled write commands comprise the write command, and belong to the plurality of host commands; and in response to the data of the one or more collected and handled write commands having filled up the write buffer region, the controller flushes the write buffer region to write the data within the write buffer region into the NV memory.

20. The controller of claim 19, wherein the operation of receiving said at least one command is executed multiple times, and the plurality of commands comprise respective commands of multiple executions of the operation of receiving said at least one command.

* * * * *